Jan. 26, 1932.     W. S. GRAHAM     1,842,779
TRACTOR PLOW
Filed June 21, 1930    4 Sheets-Sheet 2
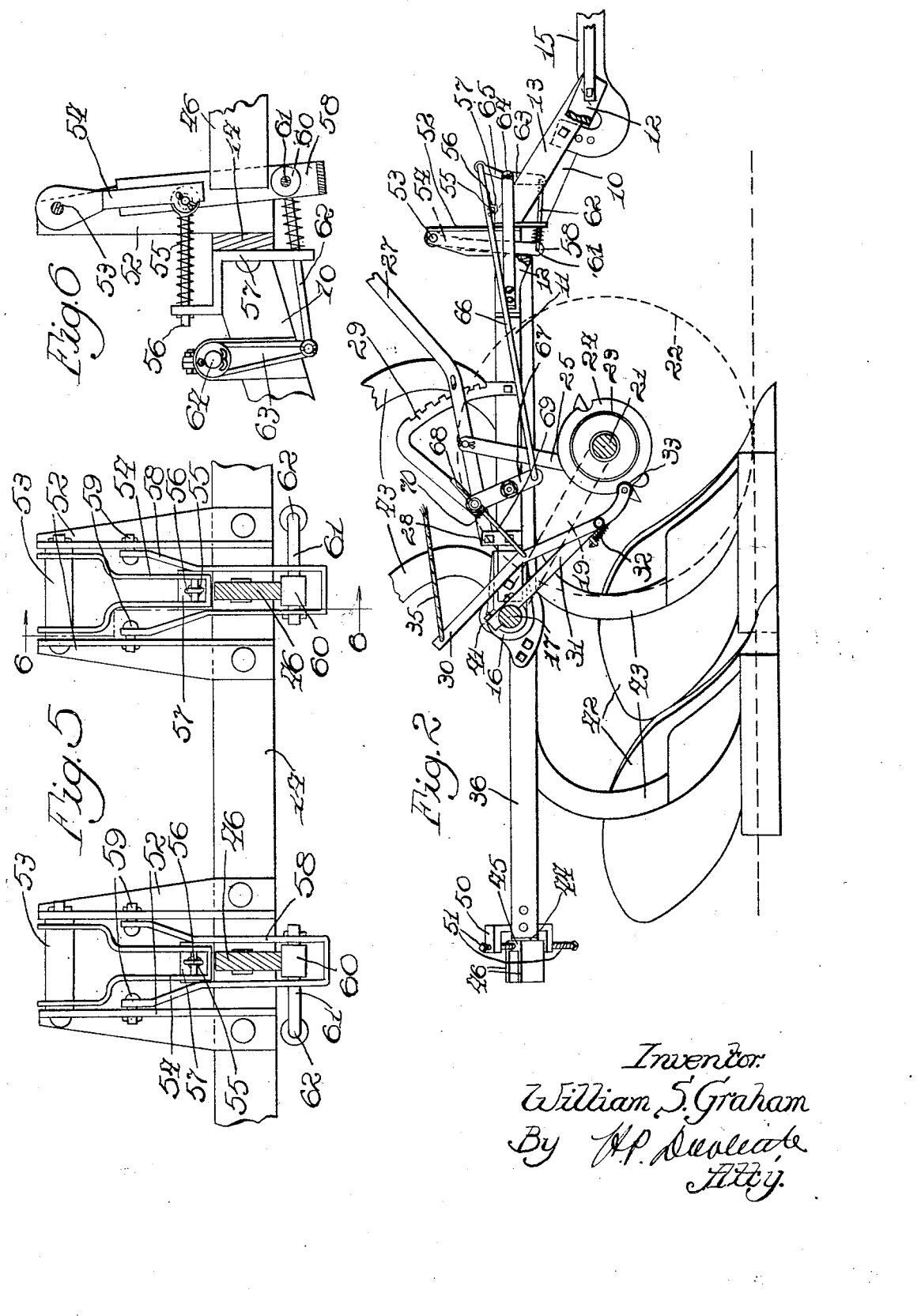
Inventor
William S. Graham
By H. P. Doolittle
Atty.

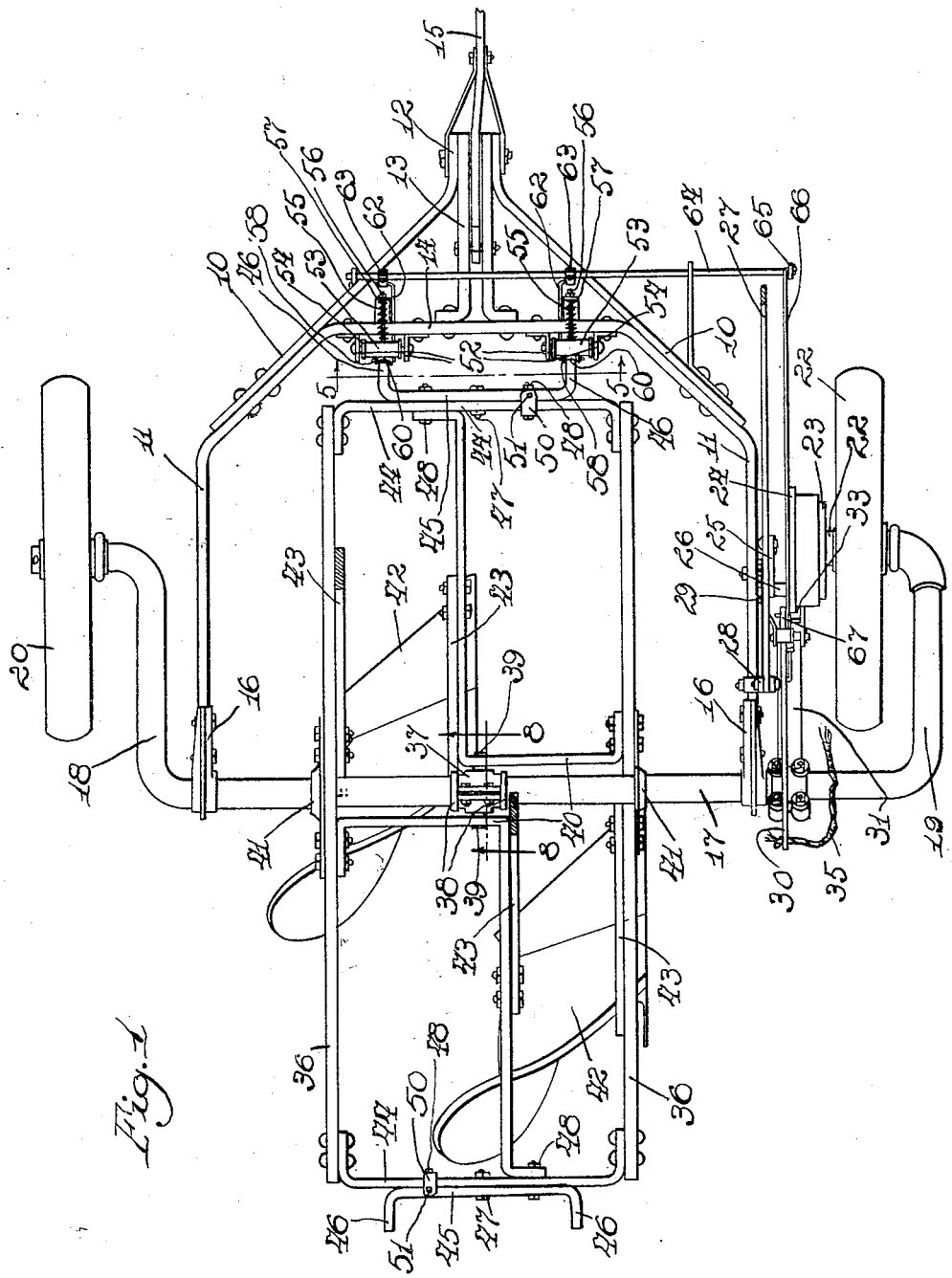

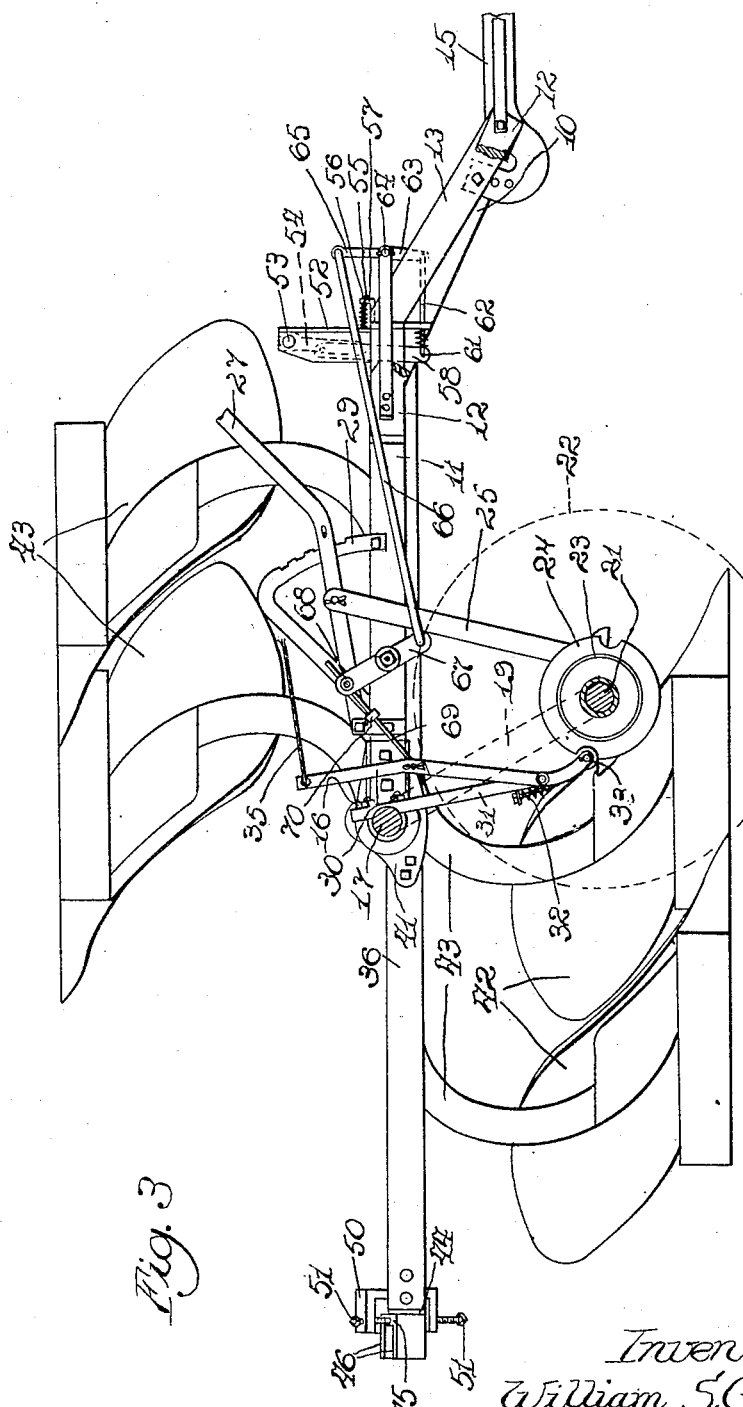

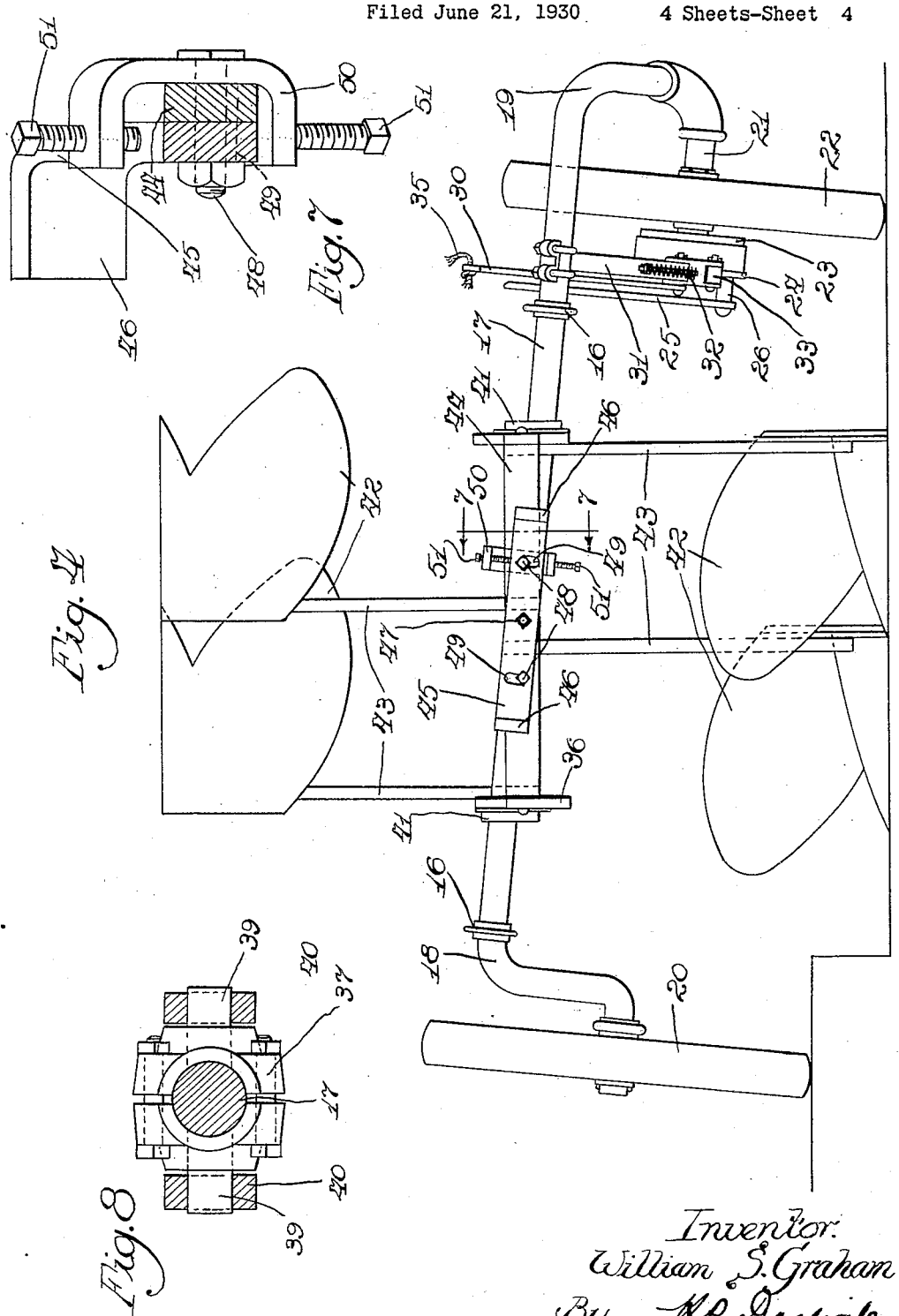

Patented Jan. 26, 1932

1,842,779

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

TRACTOR PLOW

Application filed June 21, 1930. Serial No. 462,826.

The present invention relates to so-called two-way or hillside plows, and more particularly to those of the turn-over type having oppositely throwing plows mounted on opposite sides of the axis of a rotatable support for alternately bringing the respective plows into engagement with the soil.

The main objects of the invention are to simplify the general structure of a tractor plow of the type stated and to embody in the simplified structure traction actuated means for lifting and lowering the plows, means for automatically retaining the plows in desired position with respect to the ground after each rotation, releasable means for securely interlocking the fixed and rotatable parts of the machine automatically after each rotation, and a single device for controlling both the lifting of the plows and the rotation thereof.

Other minor objects and advantages will become apparent from the following detailed description of the organization and details of construction in which the invention resides, a preferred embodiment thereof being illustrated in the accompanying drawings, where:

Figure 1 is a plan view of a plow embodying the invention, with the beams of one set of plows shown in section;

Figure 2 is a side view of the plow in lowered position with the beams of the upper plows and a portion of an axle crank shown in section;

Figure 3 is a similar side view showing the raised position;

Figure 4 is a rear view;

Figure 5 is a detail view on line 5—5 of Figure 1;

Figure 6 is a detail of the structure shown by Figure 5 on line 6—6;

Figure 7 is an enlarged detail view on line 7—7 of Figure 4; and,

Figure 8 is a detail on line 8—8 of Figure 1.

In the present instance, the invention is illustrated as embodied in a plow structure comprising a generally U-shaped draft frame 10 having parallel arms 11 extending rearwardly. Extensions of the draft frame converge forwardly to the central longitudinal line of the machine and are there formed with downwardly inclined ends 12, which are reinforced by similarly inclined, parallel members 13 extending forwardly and downwardly from a straight transverse portion 14 on the main member of the draft frame. An adjustable draft or hitch member 15 is adjustably mounted between the members 13 and serves for connection of the machine to the draft bar of a tractor. A low point of draft connection is thus provided. On the rear ends of the arms 11 of the draft frame there are secured bearing brackets 16, in which a straight transverse portion of a shaft or axle 17 is journaled. The axle 17 is formed with cranked ends 18 and 19, respectively located at the outer side of the draft frame. On what is normally the landward side of the plow the crank 18 is bent outwardly to provide a spindle on which a land wheel 20 is mounted.

The crank 19 on the furrowward side is provided with an inwardly extending spindle 21 on which there is journaled the furrow wheel 22. The furrow wheel 22 has secured thereto the driving member 23 of an intermittent power lift clutch of a well known type and which consists of the aforesaid driving member 23 and a driven member 24. Member 24 is also journaled on the spindle 21 and is adapted to be intermittently interlocked with the driven member 23 of the clutch by means of the usual trip mechanism, to make a half revolution at each actuation. As usual in power lift devices of the type herein shown, the intermittently driven member 24 of the clutch is connected by a lifting link 25 pivoted to the pintle 26 on the clutch member 24 and to a hand lever 27 pivoted at 28 on the draft frame, and having the usual latch mechanism for engaging a rack 29 secured on the draft frame. With this construction, adjustment of the hand lever 27 determines the height to which the power lift clutch mechanism will raise the plows above the ground, as well as the depth to which they will be lowered.

The clutch mechanism just described is controlled by a trip lever 30, which may be pivoted to the lower end of a depending bar 31 rigidly secured to the transverse portion of the crank axle. The usual spring 32 tends to press the lower end of the trip lever 30 which carries a trip roller 33, into contact with the rim of the clutch member 24 so that the roller will engage the opposite trip notches. A pull rope 35 extends forwardly from the trip lever to the driver's station on the tractor drawing the plow.

The transverse portion 17 of the axle constitutes that part of the draft frame which supports the oblong plow carrying frame 36, best seen in Figure 1. This frame is preferably of rectangular form, as illustrated, and extends fore and aft within the draft frame. In order to provide for rotation of the plow carrying frame around axle 17 as an axis and also to provide for lateral tilting or angular movement of the plow carrying frame on a pivot extending longitudinally of the machine, there is provided a bearing sleeve or member 37 which is journaled on the axle 17 midway between the arms 11 of the draft frame and is held in position by set collars 38. The bearing member is preferably formed of two vertically positioned sections bolted together, as shown, and each section is provided with an outwardly extending trunnion 39, which trunnions are in alignment and diametrically opposed on the bearing member. The plow carrying frame 36 is provided with central transverse members 40 extending across the central longitudinal line of the frame, which are provided with bearings receiving the trunnions 39. The lateral members of the plow carrying frame 36 are provided with guide members 41, each of these members comprising a vertical slot engaging the axle 17 thereby providing for tilting movement of the plow carrying frame on the trunnions 39 within the limits permitted by the slots in the guide members 41.

The plow carrying frame carries one or more plow bodies 42 at each side thereof. Two plow bodies are shown at each side of the frame rigidly secured to the frame by beams 43 extending vertically therefrom and rigidly bolted thereto and so disposed as to balance one another. To control the rotation of the plow carrying frame about the axle 17, and also the proper set or level of the plow carrying frame and plows, each of the two transverse members 44 forming the end pieces of the plow carrying frame are provided on their outer sides with elongated members 45 formed with outwardly projecting latch engaging arms 46 at each end. Each member 45 is mounted on its bar 44 by means of a central pivot bolt 47 and laterally spaced guide bolts 48 engaging short arcuate slots 49 formed in the member 45. Each end member 44 has secured thereto a vertical yoke piece 50, the arms of which overhang opposite edges of the member 45 near one end thereof, and the arms of the yoke member are screw threaded for the reception of opposite set screws 51 engaging the upper and lower edges of the member 45.

With the construction described, each latch member 45 may be angularly adjusted on the bolt 47 and rigidly held by the screws 51 at desired adjustment. For engagement by the arms 46 on members 45 and for cooperation therewith as complemental latching mechanism, the transverse portion 14 of the draft frame is provided with latching devices spaced to correspond with the spacing of the arms 46 and constructed to automatically receive and retain said arms at each half revolution of the plow carrying frame. In the form illustrated, (Fig. 5) each latch device comprises a pair of vertical members 52 secured to the bar 14 of the draft frame at the lower ends and connected by a rod or shaft 53 at the upper ends.

The rod 53 has pivoted thereon a depending pawl or latch piece 54 having a roller or block at its lower end and which is spring pressed towards the plow carrying frame by means of a spring 55 mounted on a rod 56, which passes through a lug on an abutment 57 secured to the forward face of the bar 14, as best shown in Figure 6. The vertical members 52, below the pin 53, carry a second depending yoke-shaped latch piece 58, the arms of which extend upwardly and are pivoted on pins 59 mounted on the members 52. At the lower end of the yoke piece 58 there is a roller 60, which is journaled on a shaft 61, which passes through the sides of the yoke piece 58 and constitutes an angular extension of a rod 62, which extends forwardly through the abutment 57 and has pivotal connection with a crank arm 63 secured to a shaft 64 journaled across the forward end of the draft frame, as shown in Figure 1. The arrangement of parts is such that the roller 60 is spaced below the end of the latching pawl 54 a distance slightly greater than the vertical width of the arms 46, as seen in Figures 5 and 6. With this construction it will be understood that, as the arms 46 approach the latching devices from above during rotation of the plow carrying frame, they will first engage the lower ends of the pawls 54 which will yield and permit the arms 46 to pass downwardly into engagement with the roller 60, the pawls 54 springing back and preventing the reverse rotation of the frame. In order to release the arms 46 as desired, means is provided for swinging the yokes 58 forwardly thereby withdrawing the rollers 60 from below the ends of the arms 46 when the drag of the plows will cause the carrying frame to make a half revolution. The means comprises the shaft 64, one end of which extends outwardly to a point in alignment with the trip lever 30. At that end, shaft 64 is provided with an upwardly extending crank 65 to which there is pivoted a rearwardly extending link 66, which is connected in turn to the lower end of a lever 67 pivoted intermediate its ends on the side member 11 of the draft frame. The upper end of the lever 67 is provided with an apertured pivot piece 68 slidably receiving the end of a rod 69 extending upwardly from and pivoted on an intermediate portion of the trip lever 30. A stop or abutment 70 is secured on the rod 69 in position to engage the upper end of the lever 67 when the plows are in the lowered position shown in Figure 2. This structure is in effect a lost motion connection in one position of the draft frame. When the plows are in raised position, as in Figure 3, the rod 69 will be drawn away from the lever 67, due to the fact that the trip lever 30 moves with the axle 17 and is carried rearwardly with the crank 19 when the plows are raised, thereby carrying the abutment 70 away from the lever 67 a distance sufficient to preclude transmission of any movement of the lever 30 to the lever 67 when the draft frame and plows are in raised position. When the plows are lowered, however, as in Figure 2, a pull on the rope 35 will swing the trip lever 30 forwardly, and this movement will be communicated through the rod 69 and abutment 70 to the lever 67, which in turn will serve to oscillate the shaft 64 through the pull on link 66, thereby withdrawing the latch pieces 58 and rollers 60, and releasing the arms 46, so that the plow carrying frame will rotate as the draft frame is being raised by the lift mechanism.

The manner of operation is such, therefore, that the single control afforded by the trip lever 30 and pull rope 35 serves to actuate the power lift mechanism and the latch releasing mechanism simultaneously when the plows are to be lifted from the ground and reversed. When this has been effected and the draft frame remains in raised position, the next pull on the trip lever will actuate only the lift mechanism and permit the plows to engage the soil.

In connection with the novel latch mechanism and releasing mechanism above described, the construction and relation of parts provide for proper adjustment of the tilt of the plow carrying frame to suit different depths of plowing and the corresponding amount of tilt which the draft frame assumes when in plowing position, as well illustrated by Figure 4. This adjustment is provided in the members 45, which may be adjusted so that they will extend in the same plane as the draft frame at whatever depth of plowing is desired and thereby permit the required amount of tilt or angular movement of the plow carrying frame on the trunnions 39, within the limits of the slots in the guide members 41, as the two frames interlock thereby keeping the plow carrying frame in horizontal position.

The latch mechanism accordingly embodies means for securely interlocking the two frames at laterally spaced points and for governing the angle of the plow carrying frame with respect to the draft frame and axle to thereby maintain the required level of the plows in any tilted plowing position of the draft frame. Also the relation of the control element or trip lever 30 to the lift mechanism and latch releasing means is such that a single control serves for both.

The construction above described illustrates a preferred embodiment of the invention which, however, may be modified as to organization and details of construction without departure from the invention as defined in the following claims.

What is claimed is:

1. In a two-way plow of the turn-over type, the combination of a wheel supported draft frame, opposite plow bodies pivoted on the frame for rotation about a horizontal axis, trip controlled power lift mechanism for raising and lowering the frame on its wheels, latch mechanism for locking the plows in position after rotation, means for actuating the lift mechanism, means for releasing the latch mechanism, a single control element for actuating the latch and lift mechanism, and means actuated through lifting movement of the frame for removing the latch releasing mechanism from control by the single control element while the frame is in raised position.

2. In a two-way plow of the turn-over type, the combination of a draft frame, a cranked axle journaled on the frame, ground wheels on the crank portions of the axle, opposite plow bodies pivoted in the frame for rotation about a transverse axis, traction actuated mechanism for oscillating the cranked axle to lift and lower the frame, latch mechanism for locking the plows in position after rotation, a control device carried by the axle for actuating the traction actuated lift mechanism, means on the frame for releasing the latch mechanism, and means for causing joint operation of the lift mechanism and the latch releasing means comprising a lost motion connection between the control device and the latch releasing means.

3. In a two-way plow of the turn-over type, the combination of a draft frame, a cranked axle journaled on the frame, ground wheels on the crank portions of the axle, opposite plow bodies pivoted in the frame for rotation about a transverse axis, traction actuated mechanism for oscillating the cranked axle to lift and lower the frame, latch mechanism for locking the plows in position after rotation, a control device carried by the axle for actuating the traction actuated lift mechanism, means on the frame for releasing the latch mechanism, means for causing joint operation of the lift mechanism and the latch releasing means when the frame is in lowered position and for preventing joint operation when the frame is raised comprising a trip lever on the frame and a trip lever on the axle being parts of the latch releasing means and control device respectively, a link pivoted on one of said levers and slidably connected to the other lever, and an abutment on the link in contact with the slidably connected lever when the frame is in lowered position and becoming remote from said lever when the frame is in raised position.

4. A two-way plow of the turn-over type comprising a wheel supported draft frame, a plow carrying frame pivoted within the draft frame on both a transverse and a longitudinal axis and having opposite portions extending radially from said transverse axis, plow bodies secured to the frame and positioned on the opposite sides thereof, transversely spaced arms projecting from the respective ends of the extended portions of the plow carrying frame, and correspondingly spaced holding means on the draft frame for receiving the arms on either end of the plow carrying frame after each rotation of the frame and retaining said frame against movement on either axis and in substantially horizontal position.

5. A two-way plow of the turn-over type comprising a wheel supported draft frame having a transvere member and laterally spaced side members, a transverse shaft mounted on the side members parallel with and remote from the transverse member, an extended plow carrying frame pivoted at its center on said shaft for longitudinal rotary and lateral tilting movements, plow bodies secured to the frame and positioned on opposite sides thereof, transversely spaced arms projecting from the respective ends of the plow carrying frame, and correspondingly spaced latching devices carried by the transvere member of the draft frame and acting to releasably receive the arms at either end of the plow carrying frame and lock said frame against both rotary and tilting movements.

6. A two-way plow of the turn-over type comprising a U-shaped draft frame having its arms extending rearwardly, a wheel supported axle mounted on the ends of the arms and extending across the draft frame, an oblong plow carrying frame extending in a fore and aft direction within the draft frame and pivoted at its center on the axle for rotation around it and for limited tilting movement thereon laterally, plow bodies at opposite sides of the frame having beams secured thereto, transversely spaced arms adjustably mounted on the respective ends of the plow carrying frame, correspondingly spaced latching devices mounted on the forward portion of the draft frame for engagement by the arms on each end of the plow carrying frame alternately to lock said frame against both rotary and tilting movements, and means for simultaneously releasing the arms from both latching members at will.

7. A two-way plow of the turn-over type comprising a wheel supported draft frame including side members and a transverse shaft, an oblong plow carrying frame extending fore and aft within said frame, plow bodies secured on the opposite sides of said plow carrying frame, a bearing member journaled on the shaft centrally of said plow carrying frame and to which said frame is pivoted for angular movement on an axis perpendicular to the shaft, and complemental latching devices on the draft frame and plow carrying frame for locking the frames together including means for governing the angular relation of the plow carrying frame to the shaft.

8. The structure of claim 7 with the complemental latching devices comprising a transversely extending member mounted on each end of the plow carrying frame and pivoted thereon for angular adjustment about an axis extending longitudinally of said frame, a pair of laterally spaced horizontally projecting arms on each member, and a pair of correspondingly spaced latching members on the draft frame for receiving said arms.

9. A two-way plow of the turn-over type comprising a wheel supported draft frame including side members and a transverse shaft, an oblong plow carrying frame having side members spaced from one another and formed with central vertically extending guides receiving the shaft, a bearing member journaled in the shaft centrally of the plow carrying frame and to which said frame is pivoted for angular movement on an axis perpendicular to the shaft, plow bodies secured on the opposite sides of the plow carrying frame, and complemental latching devices on the draft frame and plow carrying frame for locking the frames together including means for governing the angular relation of the plow carrying frame to the shaft.

10. A two-way plow of the turn-over type comprising a wheel supported draft frame including side members and a transverse shaft connecting the side members, a sleeve journaled on the mid-portion of said shaft and formed with opposite trunnions, an oblong plow carrying frame extending fore and aft within said draft frame and having central cross-members pivoted on the trunnions, plow bodies positioned on opposite sides of the plow carrying frame having vertically extending beams secured thereto, latch pieces formed with spaced projecting arms and mounted on each end of the plow carrying frame for angular adjustment about an axis extending longitudinally of the plow carrying frame, and correspondingly spaced latching devices on the draft frame adapted to receive said arms and lock the plow carrying frame to the draft frame.

11. In a two-way plow of the turn-over type, the combination of a wheel supported draft frame, a plow carrying frame mounted in the draft frame for rotation on a transverse pivot and for lateral tilting movement with respect to the draft frame on a longitudinal pivot, plow bodies secured on opposite sides of the plow carrying frame, releasable means for interlocking the two frames after each half rotation of the plow carrying frame, and means comprised in said interlocking means for governing the tilt of the plow carrying frame when interlocked.

In testimony whereof I affix my signature.

WILLIAM S. GRAHAM.